United States Patent [19]
Rohl et al.

[11] 3,864,393
[45] Feb. 4, 1975

[54] PROCESS FOR THE PRODUCTION OF OXALIC ACID

[75] Inventors: Hermann Rohl; Wilhelm Knepper, both of Marl, Germany

[73] Assignee: Chemische Werke Huels Aktiengesellschaft, Marl, Germany

[22] Filed: Jan. 7, 1974

[21] Appl. No.: 431,373

[30] Foreign Application Priority Data
Jan. 11, 1973 Germany............................ 2301197

[52] U.S. Cl. ............................. 260/538, 260/533 R
[51] Int. Cl. ............................................. C07c 51/24
[58] Field of Search.......................... 260/538, 537 p

[56] References Cited
UNITED STATES PATENTS
1,509,575   9/1924   Young ................................ 260/538
2,322,915   6/1943   Brooks................................ 260/538
3,652,669   3/1972   Levine ................................ 260/538

Primary Examiner—Vivian Garner
Attorney, Agent, or Firm—Millen, Raptes & White

[57] ABSTRACT

The nitrous oxides released when ethylene oxide is introduced at 30°–70°C. into aqueous nitric acid of 50–70 percent by weight of $HNO_3$ is recirculated thereto and gaseous oxygen is introduced into the nitric acid. A post-oxidation holding of the oxidation mixture for 8–24 hours at 30°–70°C. increases the yield of oxalic acid.

10 Claims, 1 Drawing Figure

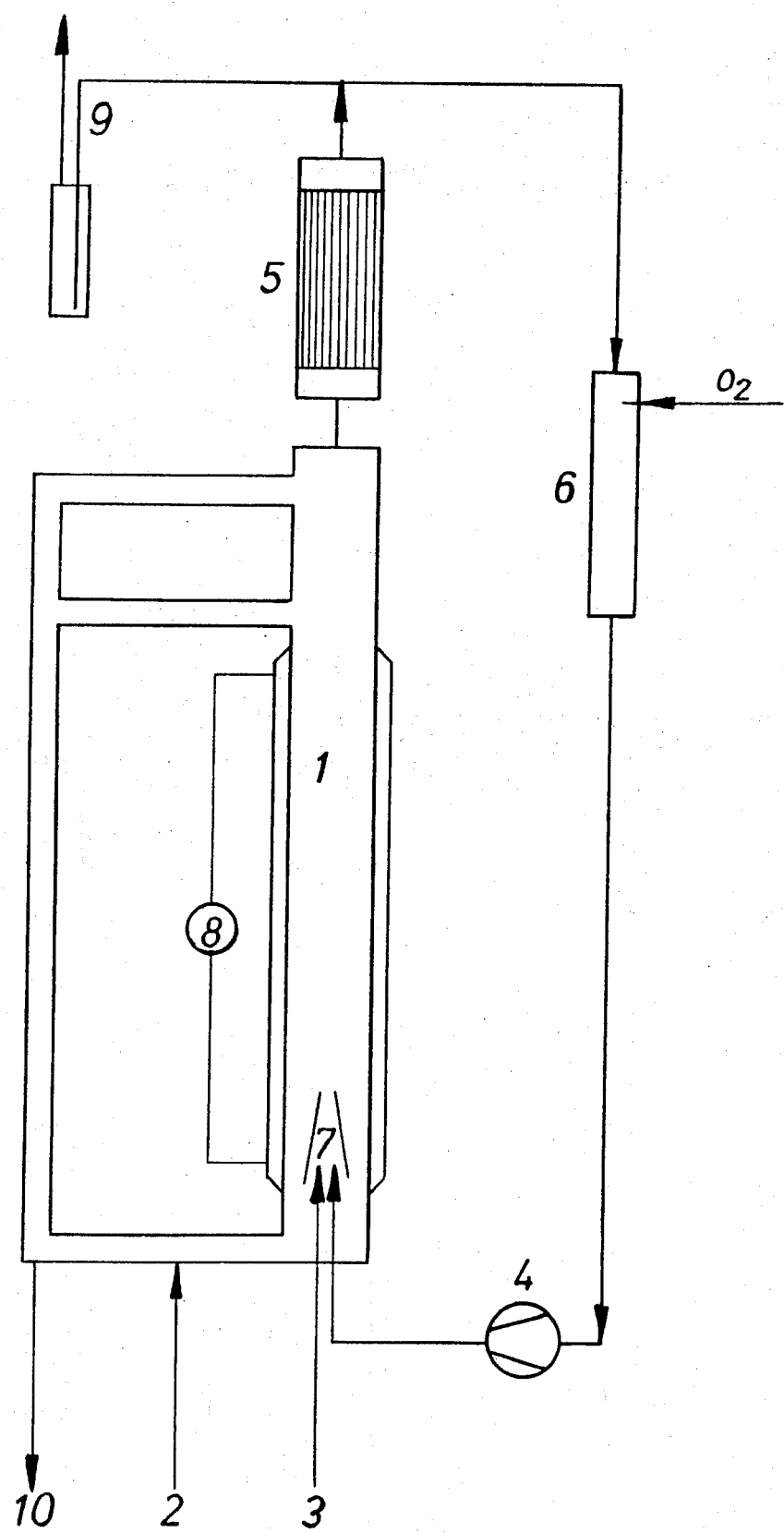

PROCESS FOR THE PRODUCTION OF OXALIC ACID

BACKGROUND OF THE INVENTION

Even today, oxalic acid is produced primarily by thermal cracking of alkali formates or by way of the oxidation of carbohydrates. These processes are, however, technically unsatisfactory, so that efforts have been made to prepare oxalic acid by other methods.

It is known to produce oxalic acid by the oxidation of acetylene using mercury-containing nitric acid (German Pat. Nos. 377,119 and 409,947). This process has not become popular in practice, because of the expensive starting material and the presence of mercury ions as a catalyst.

It is also conventional to prepare oxalic acid by the oxidation of propylene with nitric acid or nitric-acid-containing sulfuric acid (German Pat. No. 742,053) or with liquid nitrogen dioxide and then with nitrating acid (U.S. Pat. No. 3,081,345). These processes are uneconomical, since one third of the propylene molecule is lost by the oxidation, which loss also causes an additional consumption of expensive nitric acid.

A process is also known wherein oxalic acid is prepared by the oxidation of ethylene employing a certan nitric acid - sulfuric acid - water mixture (German Pat. No. 1,593,318). Although this process does not exhibit the general shortcomings of the propylene oxidation, it yet has the disadvantages that care must be taken, during a large portion of the reaction period, that a specific range for the composition of the ternary oxidation mixture of sulfuric acid, water, and nitric acid is maintained, and that the sulfuric acid, which is necessary to effect the reaction but which does not take part therein, is diluted by the thus-formed water and must constantly be replenished to maintain the concentration. Also, the yields of oxalic acid are not completely satisfactory.

It is therefore an object of this invention to provide a simple chemical process to produce oxalic acid in a simple operation and in high yields. Other objects and advantages of this invention will become apparent upon further study of the specification and appended claims.

SUMMARY OF THE INVENTION

According to this invention, oxalic acid is produced by the oxidation of ethylene oxide in aqueous nitric acid by introducing nitrous gases and gaseous oxygen at a temperature of 30°–70°C., preferably 40°–60°C., into the aqueous nitric acid containing 50–70 percent, preferably 55–60 percent by weight of $HNO_3$, and maintaining the nitric acid at this concentration while the ethylene oxide is introduced therein.

DETAILED DISCUSSION

When ethylene oxide is introduced into nitric acid, nitrous gases are formed, i.e., a mixture of nitrogen oxides consisting substantially of NO, $NO_2$, and $N_2O_3$. These nitrous gases are advantageously utilized as the source of the nitrous gases required in the process of this invention, so that in this way the process does not require another source of nitrous gases. Thus, the nitrous gases leaving the reaction mixture are preferable recycled through the latter after adding oxygen thereto. Oxygen is added in order to keep the consumption of nitric acid and nitrous gases at a minimum, by providing a considerable portion of the oxygen required for oxidizing the ethylene oxide to oxalic acid. Furthermore, it was found that the rate at which the ethylene oxide is absorbed by the reaction mixture is increased by the oxygen addition. It is not certain whether the gaseous oxygen is effective solely via an intermediary oxidation to nitrogen dioxide of the recycled nitrous gases or the nitrous gases dissolved in the reaction mixture, or whether this oxygen also partakes directly in the oxidation of the ethylene oxide. The amount of oxygen added is not critical. However, in the interest of minimizing the consumption of nitric acid and nitrous gases, an excess of oxygen preferably is added, for example by introducing such a quantity of oxygen that free oxygen is present in the gases exiting from the reaction mixture. If the pressure in the apparatus rises too sharply because of an excessive evolution of nitrous gases, the oxygen feed will, of course, be reduced until the quantities of excessive nitrous gas have been reduced. Adding much more oxygen than is consumed in the reaction mixture does not provide any additional advantages. Moreover, the cost of recycling of the gases leaving the reaction mixture becomes higher. For the same reason, the oxygen is advantageously admixed to the nitrous gases in the pure form rather than as air since, if air is used, large amounts of inert oxygen enter the system, which has to be removed from the gas cycle at great expense. For the same reason, if inert gases, such as nitrogen, carbon dioxide, etc. become too greatly concentrated in the gas cycle as reaction by-products, they must again be eliminated from the gas circulation.

The aqueous nitric acid required for the reaction contains about 40–70 percent by weight of $HNO_3$. No sulfuric acid is required or desired. At below a content of about 40 percent by weight of $HNO_3$, the reaction takes place only incompletely, whereas at about a content of about 70 percent by weight of $HNO_3$, the thus-produced oxalic acid is burned to carbon dioxide when the reaction course takes place uncontrolled. A content of 50–55 percent by weight of $HNO_3$ has proved to be especially advantageous. The temperature necessary for the reaction is about 30°–70° C. At below about 30° C., the reaction velocity becomes increasingly less and, also, undesired ester formation occurs. At above about 70° C., the formation of undesired by-products, e.g., carbon dioxide, occurs to an increasing extent. The temperature range of about 50°–60° C. has proved to be especially favorable, both with respect to the formation of the product, as well as with respect to the reaction speed. The reaction temperature is also somewhat dependent on the concentration of the nitric acid. Thus, in order to reduce the formation of by-products at higher nitric acid concentrations, a lower reaction temperature should be employed whereas in the case of lower nitric acid concentrations, a higher temperature should be selected in order to increase the reaction velocity. However, in all cases, these variables are maintained within the ranges stated herein.

The ethylene oxide necessary for the reaction can be introduced into the reaction mixture either as a liquid or in the gaseous phase. In general, the gaseous phase is preferred, for reasons of processing technology. A feed rate is selected whereby all of the entire ethylene oxide which is introduced is absorbed by the reaction mixture, in order to preclude the danger of possible explosions. The speed with which the ethylene oxide is absorbed depends extensively on the temperature, the nitric acid concentration and the distribution of the ethylene oxide therein.

At the beginning of a reaction, the reactor is filled with the nitric acid and suitably the inert gases are displaced by oxygen or nitrous gases, or a mixture of both, and then the gas circulation is initiated. Thereafter, ethylene oxide is introduced into the nitric acid, if necessaary initially while still feeding nitrous gases to the nitric acid. Then the addition of oxygen is initiated. It is also possible to displace the inert gases solely with oxygen and then introduce ethylene oxide gently into the nitric acid until nitrous gases have evolved from the nitric acid and the reaction is initiated, the consumed oxygen being constantly replaced.

Both pure as well as technical grade nitric acid can be employed, i.e., technical grade nitric acid is available in concentrations of 50 to 98 percent $HNO_3$ and contains more or less small amounts of $N_2O_4$ and very small amounts of $HNO_2$, $H_2SO_4$, and salts of Fe, Ca, As and of heavy metals like Pb. The use of technical nitric acid is not only economical, it also has the advantage that the reaction is more readily started due to the already present nitrous gas content.

In order to provide maximally advantageous conditions for the separation of the thus-produced nitric acid from the reaction mixture, it is desirable to produce a reaction mixture having a maximum concentration of oxalic acid, from which the oxalic acid can be readily separated, for example by crystallization. On the other hand, it is disadvantageous to allow the oxalic acid concentration in the reaction mixture to rise so much that there is the danger that the oxalic acid, upon slight cooling of the mixture, crystallizes in pipelines and clogs them. It has proven to be advantageous to introduce an amount of ethylene oxide into the nitric acid, or the reaction mixture, such that the weight ratio of charged nitric acid to ethylene oxide introduced therein is at least 5 : 1, e.g., about 6:1 to 8:1, especially since below this weight ratio the speed with which ethylene oxide is absorbed into the reaction mixture is rapidly reduced.

After the feeding of ethylene oxide is terminated, the thusproduced oxalic acid can be separated from the reaction mixture in a conventional manner, for example by cooling and crystallization. However, it was found that the yield of oxalic acid can be still further increased if the reaction mixture is subjected, after stopping the gas feed, to a post reaction in which the reaction mixture is allowed to stand for some time at an elevated temperature. During this time, intermediate products still present in the reaction mixture are decomposed to oxalic acid. The time period for the post reaction is up to about one day, e.g., about 8-24 hours at a temperature of about 30°-70° C. A temperature range of 40°-50° C. has proven to be especially advantageous. The time required depends on the temperature and the concentration of the nitric acid. For example, at a temperatuare of about 50° C. and a nitric acid concentration of about 50 percent by weight, the post reaction takes approximately 12 hours for completion. After termination of the post reaction, the oxalic acid is then separated from the reaction mixture in a conventional manner.

The mother liquor remaining after the separation of the oxalic acid can again be utilized for the reaction with ethylene oxide by restoring it to its initial concentration, e.g., with 100 percent strength $HNO_3$. If by-products of the reaction, such as, for example, polymers or ethers, become too greatly enriched in the mother liquor, these interfering impurities must be removed. This is generally accomplished by working up a more or less large portion of this mother liquor, e.g., by distillation, to pure nitric acid and recombining this product with the residual mothor liquor.

The process of the present invention can also be conducted continuously. In a continuous operation, ethylene oxide is first introduced, while the nitric acid is being recycled, until the weight ratio of nitric acid to thus-fed ethylene oxide has reached the desired value. Then, while continuing the introduction of ethylene oxide and the recirculation of the reaction mixture, a partial stream is separated from the reaction mixture; the greatest portion of the thus-formed oxalic acid is removed therefrom, optionally after conducting the post reaction; the oxalic-acid-depleted mother liquor is restored to the required $HNO_3$ concentration, e.g., by adding 100 percent strength nitric acid, optionally after removing excessive amounts of impurities; and the thus-replenished mother liquor is recycled into the reaction mixture. The size of the withdrawn partial stream rich in oxalic acid and concomitantly the amount of recycled, replenished, oxalic-acid-depleted mother liquor preferably is metered so that the concentration of oxalic acid and/or the weight ratio of nitric acid to introduced ethylene oxide in the withdrawn partial stream rich in oxalic acid remains at the desired value, in order to have available constant conditions for the subsequent separation of the oxalic acid from this partial stream.

In a discontinuous operation, the gas feed is stopped after reaching the desired concentration of organic compounds, and the thus-formed oxalic acid is separated, or the reaction mixture is maintained in the post reaction stage for the required period of time. In the post reaction, additional amounts of nitrous gases are liberated. During continuous operation, these nitrous gases can be introduced into the gas cycle of the nitrous gases, whereas, in discontinuous operation, they must be worked up in some other way, e.g., to obtain nitric acid.

The process of this invention can be conducted under both ambient and elevated pressures. When the pressure is increased, the solubility of the nitrogen oxides in the reaction mixture rises, which results in favorable oxidizing conditions. However, since increased pressure also entails increased expenditures for pressure apparatus, the reaction is normally conducted under a pressure of 0 to 1 atmosphere gauge. In this range, the technical expenses are low. The advantages attainable by the process of this invention reside, above all, in that high yields of oxalic acid are obtained in a simple and uncomplicated reaction. Also, it is now possible to provide the oxygen required for oxidizing the ethylene oxide to oxalic acid predominantly as gaseous oxygen.

Without further elaboration, it is believed that one skilled in the art can, using the preceding description, utilize the present invention to its fullest extent. The following preferred specific embodiment is, therefore, to be construed as merely illustrative, and not limitative of the remainder of the specification and claims in any way whatsoever.

EXAMPLE

The apparatus employed is shown schematically in the drawing, consists of a cylindrical reaction vessel 1 made of glass and having a height of 80 cm., a diameter of 5 cm., and a capacity of 1572 cm$^3$. The reaction vessel is provided laterally with a tube system making it possible to maintain the reaction solution in circulation. The reaction vessel is furthermore provided with a cooling mantle 8. The nitrous gases produced by the introduction of the ethylene oxide from feed 3 are cooled in a gas cooler 5, mixed with oxygen in a mixing chamber 6, and recycled into the reaction vessel 1 via a blower 4, where a mixing zone 7 provides intimate mixing of ethylene oxide, nitric acid, and nitrous gases. Due to this gas feed, a forced liquid circulation is produced in the reaction vessel. During continuous operation, a portion of the reaction solution is withdrawn from the thus-obtained liquid cycle by means of the discharge point 10, which portion is subjected to the post reaction. Through the nitric acid feed 2, an amount of fresh nitric acid is added corresponding to the quantity of solution which is removed. The apparatus also includes a dip pipe 9 serving as a relief pressure valve.

Prior to the beginning of an experiment, the apparatus is purged with oxygen to remove inert gases; the nitric acid is introduced; the blower is turned on; and the nitric acid is brought to the reaction temperature. Thereafter, the ethylene oxide is added from feed 3. The recycled nitrogen-oxide-containing gases are mixed, after cooling, with gaseous oxygen and returned to the reaction solution via blower 4. The oxygen feed is adjusted so that essentially no gases escape from the relief pressure valve.

Reaction vessel 1 was charged with 3500 g. of nitric acid with 52 percent by weight of HNO$_3$ from feed 2. The nitric acid was brought to a temperature of about 55° C. by heating means (not shown). Over a period of 5 hours, 300 g. of ethylene oxide was introduced from feed 3. In order to oxidize the thus-formed recirculated nitrogen oxides, 286 g. of oxygen was also added to mixing chamber 6 during this time period, i.e., about 65 percent of the oxygen required for the oxidation of ethylene oxide (via the NO$_2$) was supplied by the gaseous oxygen. Thereafter, the reaction mixture was discharged from discharge point 10 and passed to the post rection stage (not shown), i.e., the reaction mixture was maintained for another 12 hours at a temperature of 55°-50° C. During the post reaction, 21.5 g. of nitrogen, 92.3 g. of nitrogen oxide, 84.3 g. of nitrogen dioxide, and 7.8 g. of carbon dioxide escaped from the reaction mixture. These waste gases were fed to a working-up stage. After the 12 hours had elapsed, the reaction mixture was cooled to 5° C., yielding 650 g. of oxalic acid (as the dihydrate) by precipitation. There remained 3144 g. of mother liquor containing 44.8 percent by weight of HNO$_3$ and 80 g. of oxalic acid (as the dihydrate) and 0.7 % by weight of carbon (in the form or organic compounds not determinable in detail). The oxalic acid yield, based on the ethylene oxide added to the reaction mixture, was 85 percent.

The preceding example can be repeated with similar success by substituting the generically and specifically described reactants and operating conditions of this invention for those used in the preceding example.

From the foregoing description, one skilled in the art can easily ascertain the essential characteristics of this invention, and without departing from the spirit and scope thereof, can make various changes and modification of the invention to adapt it to various usages and conditions. Consequently, such changes and modifications are properly, equitably, and intended to be, within the full range of equivalence of the following claims.

What is claimed is:

1. In a process for the production of oxalic acid by the oxidation of ethylene oxide wherein a stream of gaseous ethylene oxide is introduced into aqueous nitric acid in the presence of gaseous oxygen, the improvement which comprises introducing a mixture of nitrogen oxides and gaseous oxygen into the nitric acid concurrently with the introduction of the ethylene oxide and maintaining the nitric acid at a temperature of 30°–70° C. and at a concentration of 50–70 percent by weight of HNO$_3$.

2. A process according to claim 1 wherein the nitrogen oxides are those liberated during the reaction and recycled into the reaction mixture and the gaseous oxygen is in pure form.

3. A process according to claim 1 wherein the weight ratio of charged nitric acid to ethylene oxide is about 6:1 to 8:1, the nitric acid is maintained at 55–60 percent by weight of HNO$_3$ concentration and at a temperature of 40°–60° C.

4. A process according to claim 1 wherein sufficient gaseous oxygen is introduced into the nitric acid to maintain gaseous oxygen in the gases exiting from the reaction mixture.

5. A process according to claim 1 wherein the reaction mixture is maintained after introduction of the ethylene oxide and prior to the separation of the oxalic acid, for up to about one day at a temperature of 30°–70° C.

6. A process according to claim 5 wherein the reaction mixture is maintained, after the oxidation of the ethylene oxide, at 40°–50° C. for 8–24 hours.

7. A process according to claim 1 wherein a partial stream of the reaction mixture is separated therefrom, the oxalic acid is separated from the partial stream, and the thusproduced mother liquor is restored to the original HNO$_3$ concentration by adding nitric acid thereto and then recycled to the reaction mixture.

8. A process according to claim 7 wherein the partial stream is maintained, prior to the separation of the oxalic acid, for up to about one day at a temperature of 30°–70° C.

9. A process according to claim 7 wherein the nitric acid in the reaction mixture is maintained at 55–60 percent by weight of HNO$_3$ concentration and at a temperature of 40°–60° C and wherein the partial stream is maintained prior to separation of the oxalic acid, for up to about one day at a temperature of 30° to 70° C.

10. A process according to claim 1 wherein the nitrogen oxides are those liberated during the reaction and the gaseous oxygen is in pure form, wherein the weight ratio of charged nitric acid to ethylene oxide is about 6:1 to 8:1, the nitric acid is maintained at 55–60 percent by weight of HNO$_3$ concentration and at a temperature of 40°–60° C. and wherein sufficient gaseous oxygen is introduced into the nitric acid to maintain gaseous oxygen in the gases exiting from the reaction mixture.

* * * * *